US012670212B1

(12) United States Patent
Aggarwal et al.

(10) Patent No.: US 12,670,212 B1
(45) Date of Patent: Jun. 30, 2026

(54) TECHNIQUES FOR INTELLIGENT VIDEO HIGHLIGHT SUMMARIZATION

(71) Applicant: Oracle International Corporation, Redwood Shores, CA (US)

(72) Inventors: Ankit Kumar Aggarwal, Mumbai (IN); Reetesh Mukul, Bangalore (IN); Pramir Sarkar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/053,209

(22) Filed: Feb. 13, 2025

Related U.S. Application Data

(60) Provisional application No. 63/739,095, filed on Dec. 26, 2024.

(51) Int. Cl.
 *G06F 16/00* (2019.01)
 *G06F 16/738* (2019.01)
 *G06F 16/783* (2019.01)
(52) U.S. Cl.
 CPC ........ *G06F 16/739* (2019.01); *G06F 16/7834* (2019.01); *G06F 16/7844* (2019.01)
(58) Field of Classification Search
 None
 See application file for complete search history.

(56) References Cited

U.S. PATENT DOCUMENTS

| | | |
|---|---|---|
| 11,150,874 B2 | 10/2021 | Lester et al. |
| 11,343,377 B1 | 5/2022 | Jensen et al. |
| 11,360,993 B1 | 6/2022 | Prasad et al. |
| 11,934,781 B2 | 3/2024 | He et al. |

(Continued)

FOREIGN PATENT DOCUMENTS

| | | |
|---|---|---|
| DE | 202022100824 U1 | 3/2022 |
| KR | 20200024575 A | 3/2020 |

(Continued)

OTHER PUBLICATIONS

"GitHub—Swagger Editor", Available online at:https://github.com/swagger-api/swagger-editor, Accessed from internet on Feb. 27, 2024, pp. 1-6.

(Continued)

*Primary Examiner* — Tuankhanh D Phan

(74) *Attorney, Agent, or Firm* — Kilpatrick Townsend & Stockton LLP

(57) ABSTRACT

A Video Highlight Summarization System (VHSS) is described for generating a personalized video highlight summary from a video source (e.g., a sport match) based on a user's query. In some embodiments, the VHSS may perform multimodal data analysis. The multimodal data may include information from video, audio, and text from images associated with the video and from user's query. A user may provide a query specifying the user's preferences (e.g., events of interest) and criteria (e.g., summary duration). In some embodiments, encoded embeddings based on the video, audio, text, and the user query may be aligned to enhance similarity search result. A subset (e.g., highlights) of the video clips is selected from the video source by maximizing the summation of scores of highlight clips to best fit the user's preferences while meeting the user's criteria with diverse clips.

19 Claims, 11 Drawing Sheets

(56) References Cited

U.S. PATENT DOCUMENTS

| | | | |
|---|---|---|---|
| 12,008,332 B1 | 6/2024 | Gardner et al. | |
| 12,259,895 B1 | 3/2025 | Huang | |
| 2014/0222834 A1 | 8/2014 | Parikh et al. | |
| 2019/0095318 A1 | 3/2019 | Bahrami et al. | |
| 2021/0390127 A1 | 12/2021 | Fox et al. | |
| 2022/0067284 A1 | 3/2022 | He et al. | |
| 2023/0093304 A1 | 3/2023 | Brasburg et al. | |
| 2023/0104655 A1 | 4/2023 | Amarasingham et al. | |
| 2023/0122609 A1 | 4/2023 | Mukherjee | |
| 2023/0130974 A1 | 4/2023 | Yao et al. | |
| 2023/0245146 A1 | 8/2023 | Thangali et al. | |
| 2024/0202461 A1 | 6/2024 | Pagnoni et al. | |
| 2024/0371164 A1* | 11/2024 | Yan | G06V 10/82 |
| 2025/0111675 A1* | 4/2025 | Miao | G06V 20/48 |

FOREIGN PATENT DOCUMENTS

| | | |
|---|---|---|
| KR | 20220131050 A | 9/2022 |
| KR | 102468250 B1 | 11/2022 |
| WO | 2020031845 A1 | 2/2020 |
| WO | 2022046403 A1 | 3/2022 |
| WO | 2022240558 A1 | 11/2022 |

OTHER PUBLICATIONS

"LongSumm", Available online at: https://github.com/guyfe/LongSumm/blob/master/README.md, Accessed from Internet on Oct. 31, 2023, pp. 1-11.

"Weibull Distribution", Available online at: https://en.wikipedia.org/wiki/Weibull_distributionoldid%3D1225770231, Accessed from Internet on Jun. 18, 2024, pp. 1-2.

"What Is OpenAPI?", Available online at: https://swagger.io/docs/specification/about/, Accessed from internet on Feb. 27, 2024, pp. 1-2.

Alambo et al., "Entity-Driven Fact-Aware Abstractive Summarization of Biomedical Literature", 26th International Conference on Pattern Recognition, Mar. 30, 2022, 8 pages.

Apostolidis et al., "Video Summarization Using Deep Neural Networks: A Survey", Available online at: https://arxiv.org/pdf/2101.06072, Sep. 27, 2021, pp. 1-26.

Bardes et al., "Revisiting Feature Prediction for Learning Visual Representations from Video", Available online at: https://arxiv.org/pdf/2404.08471, Feb. 15, 2024, pp. 1-23.

Can, O , "All the English Football Terms You Need to Know", GO Blog, Global Site, Accessed from Internet on Mar. 10, 2025, pp. 1-10.

Cao et al., "Automated Generation of REST API Specification from Plain HTML Documentation", Available online at: https://link.springer.com/chapter/10.1007/978-3-319-69035-3_32, Nov. 13, 2017, pp. 453-461.

Chavez , "How to Use AI to Summarize PDF, Including ChatGPT—Saving Time on Documents", UPDF, Available online at: https://updf.com/knowledge/summarize-pdf/, Oct. 26, 2023, pp. 1-8.

Chopra et al., "Abstractive Sentence Summarization With Attentive Recurrent Neural Networks", Proceedings of Conference of the North American Chapter of the Association for Computational linguistics: Human Language Technologies, Jun. 12-17, 2016, pp. 93-98.

Gawande et al., "Deep Learning Approach to Key Frame Detection in Human Action Videos", In Recent Trends in Computational Intelligence, Feb. 12, 2020, pp. 1-16.

Gillick et al., "A Global Optimization Framework for Meeting Summarization", Institute of Electrical and Electronics Engineers International Conference on Acoustics, Speech and Signal Processing, Apr. 19, 2009, 4 pages.

Goyal et al., "News Summarization and Evaluation in the Era of GPT-3", Available online at: https://arxiv.org/pdf/2209.12356v1, Sep. 26, 2022, 19 pages.

He et al., "MA-LMM: Memory-Augmented Large Multimodal Model for Long-Term Video Understanding", Available online at: https://arxiv.org/pdf/2404.05726, Apr. 24, 2024, pp. 1-15.

Hsu et al., "HuBERT: Self-Supervised Speech Representation Learning by Masked Prediction of Hidden Units", Available online at: https://arxiv.org/pdf/2106.07447, Jun. 14, 2021, pp. 1-10.

Huang et al., "Evaluation of Review Summaries via Question-Answering", Proceedings of the 19th Annual Workshop of the Australasian Language Technology Association, Dec. 2021, 10 pages.

Huang et al., "Generating REST API Specifications through Static Analysis", International Conference on Software Engineering, Apr. 2024, 13 pages.

Li et al., "BLIP-2: Bootstrapping Language-Image Pre-training with Frozen Image Encoders and Large Language Models", Available online at: https://arxiv.org/pdf/2301.12597, Jun. 15, 2023, 13 pages.

Li et al., "Guiding Large Language Models via Directional Stimulus Prompting", 37th Conference on Neural Information Processing Systems (NeurIPS 2023), Available online at: https://arxiv.org/pdf/2302.11520.pdf, Oct. 9, 2023, pp. 1-27.

Lin et al., "Video-LLaVA: Learning United Visual Representation by Alignment Before Projection", Available online at: https://arxiv.org/pdf/2311.10122, Oct. 1, 2024, 14 pages.

Liu et al., "Text Summarization with Pretrained Encoders", Proceedings of the 2019 Conference on Empirical Methods in Natural Language Processing and the 9th International Joint Conference on Natural Language Processing, Aug. 1, 2019, pp. 3730-3740.

Miech et al., "HowTo100M: Learning a Text-Video Embedding by Watching Hundred Million Narrated Video Clips", Available online at: https://arxiv.org/pdf/1906.03327, Jul. 31, 2019, pp. 1-14.

Mihalcea et al., "TextRank: Bringing Order into Texts", Proceedings of the Conference on Empirical Methods in Natural Language Processing, Jul. 2004, 8 pages.

Nallapati et al., "Abstractive Text Summarization using Sequence-to-Sequence RNNs and Beyond", Available Online at: https://arxiv.org/pdf/1602.06023, 2016, 12 pages.

Ni et al., "Expanding Language-Image Pretrained Models for General Video Recognition", Available online at: https://arxiv.org/pdf/2208.02816, Aug. 4, 2022, pp. 1-22.

Otani et al., "Video Summarization Overview", Available online at: https://arxiv.org/pdf/2210.11707, Oct. 21, 2022, pp. 284-335.

Pasunuru et al., "Multi-Reward Reinforced Summarization with Saliency and Entailment", Available online at: https://aclanthology.org/N18-2102.pdf, May 29, 2018, 9 pages.

Paulus et al., "A Deep Reinforced Model for Abstractive Summarization", Published as a Conference Paper at International Conference on Learning Representations 2018, Available online at: https://arxiv.org/pdf/1705.04304.pdf, Feb. 16, 2018, pp. 1-13.

Radford et al., "Robust Speech Recognition via Large-Scale Weak Supervision", Available online at: https://arXiv:2212.04356v1, Dec. 6, 2022, pp. 1-28.

Ren et al., "Best Frame Selection in a Short Video", Association for the Advancement of Artificial Intelligence, Mar. 2020, 8 pages.

Rudra et al., "Summarizing Situational Tweets in Crisis Scenario", HT '16: Proceedings of the 27th Association for Computing Machinery Conference on Hypertext and Social Media, Available online at: https://mimran.me/papers/Summarizing_situational_tweets_HT2016.pdf, Jul. 10, 2016, pp. 137-147.

Schulman et al., "Proximal Policy Optimization Algorithms", Available Online at: https://arxiv.org/pdf/1707.06347.pdf, Aug. 28, 2017, pp. 1-12.

See et al., "Get To The Point: Summarization with Pointer-Generator Networks", Conference: Proceedings of the 55th Annual Meeting of the Association for Computational Linguistics, vol. 1, Apr. 25, 2017, 20 pages.

Sharma et al., "An Entity-Driven Framework for Abstractive Summarization", Proceedings of the 2019 Conference on Empirical Methods in Natural Language Processing, the 9th International Joint Conference on Natural Language, Processing, Association for Computational Linguistics, Sep. 4, 2019, 19 pages.

Soomro et al., "UCF101: A Dataset of 101 Human Actions Classes From Videos in The Wild", Available online at: https://arxiv.org/pdf/1212.0402, Dec. 3, 2012, pp. 1-7.

(56)        References Cited

OTHER PUBLICATIONS

Stewart, "Large Language Model Prompt Engineering for Complex Medical Research Summarization", Available online at: https://devblogs.microsoft.com/ise/2023/06/27/gpt-summary-prompt-engineering/, Jun. 27, 2023, pp. 1-4.

Tang et al., "Deep Unsupervised Key Frame Extraction for Efficient Video Classification", Available online at: https://arxiv.org/pdf/2211.06742, Nov. 12, 2022, pp. 1-16.

Vaswani et al., "Attention is All You Need", Advances in Neural Information Processing Systems, 2017, pp. 1-11.

Wan et al., "Cross-Language Document Summarization via Extraction and Ranking of Multiple Summaries", Knowledge and Information Systems, vol. 58, No. 1, Feb. 2019, 19 pages.

Wang et al., "Asking and Answering Questions to Evaluate the Factual Consistency of Summaries", Proceedings of the 58th Annual Meeting of the Association for Computational Linguistics, Available online at: https://aclanthology.org/2020.acl-main.450.pdf, Jul. 5-10, 2020, pp. 5008-5020.

Wang et al., "SQuALITY: Building a Long-Document Summarization Dataset the Hard Way", Computation and Language, Available online at: https://arxiv.org/pdf/2205.11465, May 23, 2022, 18 pages.

Wood, "Reusing Definitions Across Methods in OpenAPI", Available online at: https://blog.stoplight.io/reuse-openapi-descriptions, May 8, 2019, pp. 1-7.

Xiao et al., "Enhancing LLM with Evolutionary Fine-Tuning for News Summary Generation", Computation and Language, Available online at: https://arxiv.org/ftp/arxiv/papers/2307/2307.02839.pdf, Jul. 6, 2023, 12 pages.

Zhong et al., "A Frustratingly Easy Approach for Entity and Relation Extraction", Proceedings of the 2021 Conference of the North American Chapter of the Association for Computational Linguistics: Human Language Technologies, Jan. 2021, 12 pages.

Zhou et al., "Entity-Aware Abstractive Multi-Document Summarization", Findings of the Association for Computational Linguistics: ACL-IJCNLP 2021, Association for Computational Linguistics, Aug. 1-6, 2021, pp. 351-362.

U.S. Appl. No. 18/740,185 , Non-Final Office Action, Mailed On Dec. 30, 2025, 14 pages.

Narayan et al., "Planning with Learned Entity Prompts for Abstractive Summarization", Transactions of the Association for Computational Linguistics, vol. 9, Dec. 17, 2021, pp. 1475-1492.

U.S. Appl. No. 18/663,988, Non-Final Office Action, Mailed On Mar. 24, 2026, 30 pages.

U.S. Appl. No. 18/780,384, Non-Final Office Action, Mailed On May 8, 2026, 11 pages.

Mallick et al., "Ensemble Summarization of Bio-medical Articles Integrating Lustering And Multi-objective Evolutionary Algorithms", Applied Soft Computing, vol. 106, Jul. 2021.

Sakhadeo et al., "Effective Extractive Summarization Using Frequency-filtered Entity Relationship Graphs", Available Online at: https://arxiv.org/pdf/1810.10419, Oct. 24, 2018, 8 pages.

Zhang et al., "Far-ass: Fact-aware Reinforced Abstractive Sentence Summarization", Information Processing and Management, vol. 58, Issue 3, May 1, 2021.

\* cited by examiner

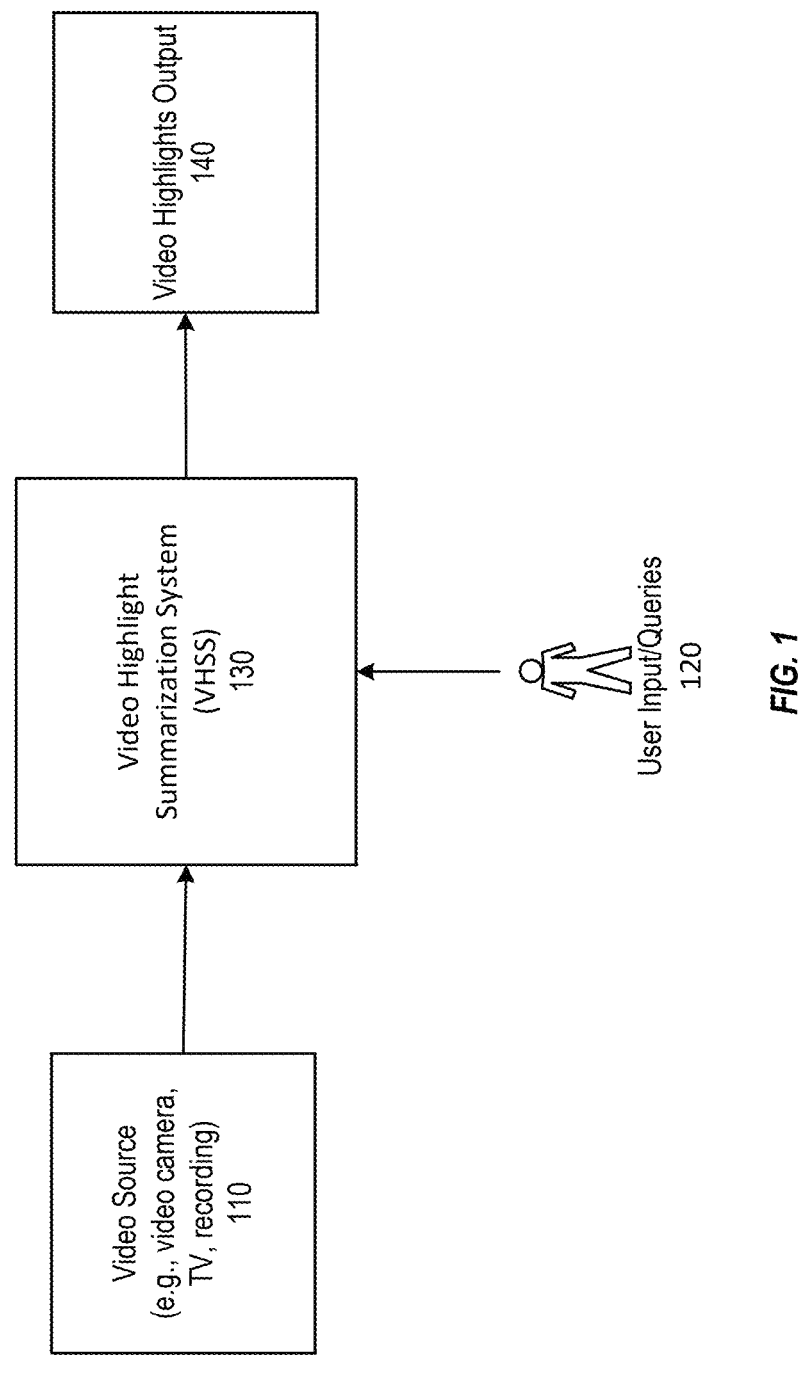
*FIG. 1*

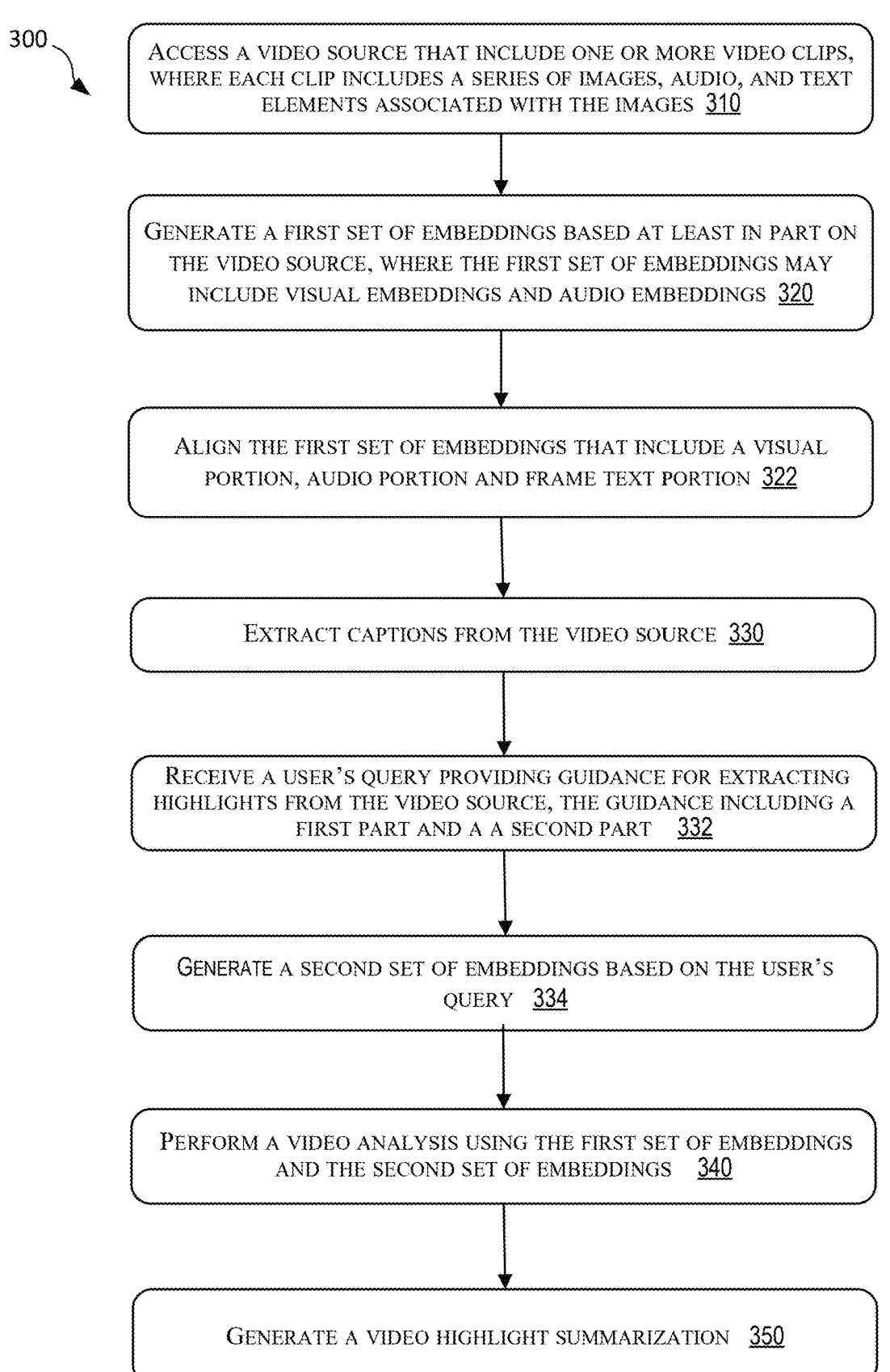

300

ACCESS A VIDEO SOURCE THAT INCLUDE ONE OR MORE VIDEO CLIPS, WHERE EACH CLIP INCLUDES A SERIES OF IMAGES, AUDIO, AND TEXT ELEMENTS ASSOCIATED WITH THE IMAGES 310

GENERATE A FIRST SET OF EMBEDDINGS BASED AT LEAST IN PART ON THE VIDEO SOURCE, WHERE THE FIRST SET OF EMBEDDINGS MAY INCLUDE VISUAL EMBEDDINGS AND AUDIO EMBEDDINGS 320

ALIGN THE FIRST SET OF EMBEDDINGS THAT INCLUDE A VISUAL PORTION, AUDIO PORTION AND FRAME TEXT PORTION 322

EXTRACT CAPTIONS FROM THE VIDEO SOURCE 330

RECEIVE A USER'S QUERY PROVIDING GUIDANCE FOR EXTRACTING HIGHLIGHTS FROM THE VIDEO SOURCE, THE GUIDANCE INCLUDING A FIRST PART AND A A SECOND PART 332

GENERATE A SECOND SET OF EMBEDDINGS BASED ON THE USER'S QUERY 334

PERFORM A VIDEO ANALYSIS USING THE FIRST SET OF EMBEDDINGS AND THE SECOND SET OF EMBEDDINGS 340

GENERATE A VIDEO HIGHLIGHT SUMMARIZATION 350

*FIG. 3*

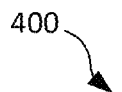
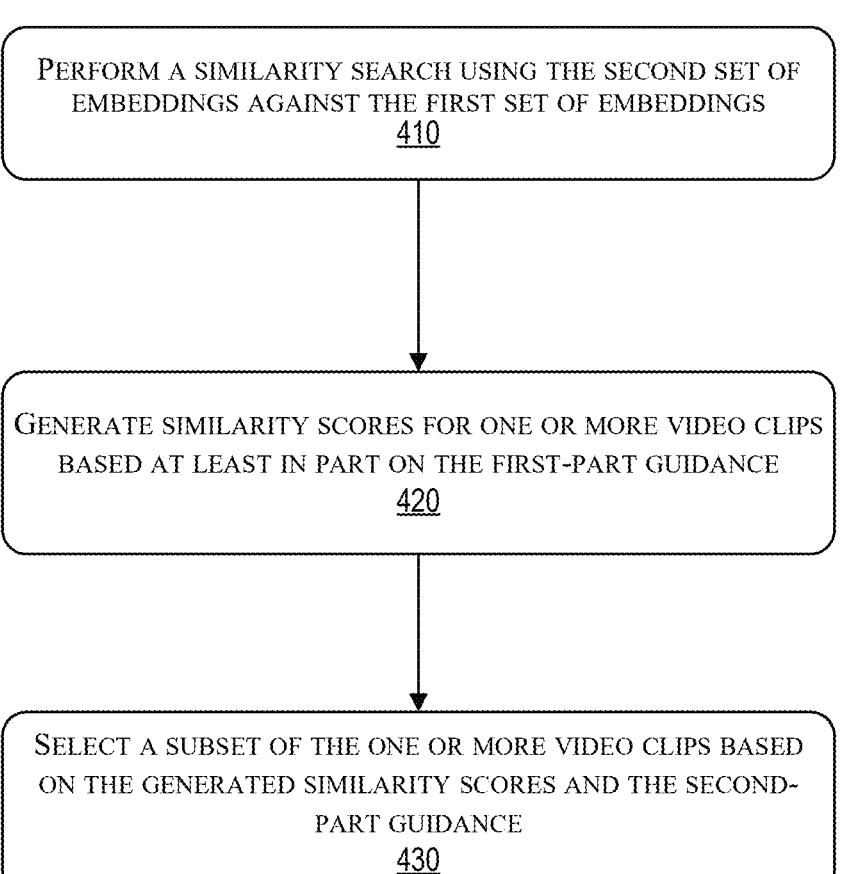
PERFORM A SIMILARITY SEARCH USING THE SECOND SET OF EMBEDDINGS AGAINST THE FIRST SET OF EMBEDDINGS
410
GENERATE SIMILARITY SCORES FOR ONE OR MORE VIDEO CLIPS BASED AT LEAST IN PART ON THE FIRST-PART GUIDANCE
420
SELECT A SUBSET OF THE ONE OR MORE VIDEO CLIPS BASED ON THE GENERATED SIMILARITY SCORES AND THE SECOND-PART GUIDANCE
430
*FIG. 4*

600

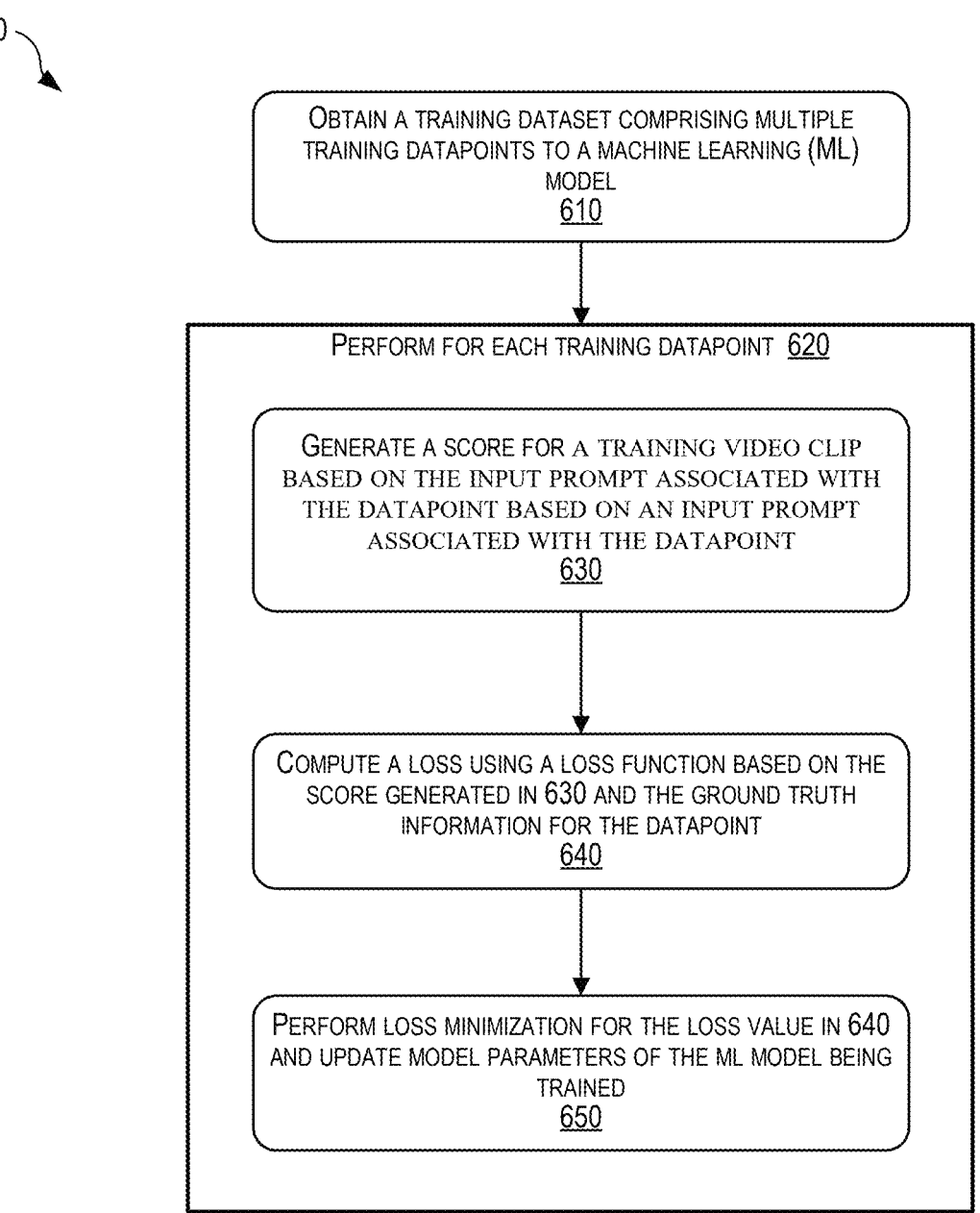

OBTAIN A TRAINING DATASET COMPRISING MULTIPLE TRAINING DATAPOINTS TO A MACHINE LEARNING (ML) MODEL
610

PERFORM FOR EACH TRAINING DATAPOINT 620

GENERATE A SCORE FOR A TRAINING VIDEO CLIP BASED ON THE INPUT PROMPT ASSOCIATED WITH THE DATAPOINT BASED ON AN INPUT PROMPT ASSOCIATED WITH THE DATAPOINT
630

COMPUTE A LOSS USING A LOSS FUNCTION BASED ON THE SCORE GENERATED IN 630 AND THE GROUND TRUTH INFORMATION FOR THE DATAPOINT
640

PERFORM LOSS MINIMIZATION FOR THE LOSS VALUE IN 640 AND UPDATE MODEL PARAMETERS OF THE ML MODEL BEING TRAINED
650

*FIG. 6*

TECHNIQUES FOR INTELLIGENT VIDEO HIGHLIGHT SUMMARIZATION

CROSS-REFERENCE TO RELATED APPLICATIONS

The present application is a non-provisional application of and claims the benefit and priority under 35 U.S.C. 119 (e) of U.S. Provisional Application No. 63/739,095, filed Dec. 26, 2024 entitled "TECHNIQUES FOR INTELLIGENT VIDEO HIGHLIGHT SUMMARIZATION," the entire contents of which is incorporated herein by reference for all purposes.

FIELD

The present disclosure generally relates to artificial intelligence (AI)/machine learning (ML). More specifically, a Video Highlight Summarization System (VHSS) is described for generating a personalized video highlight summary from a video based on a user's query.

BACKGROUND

In today's information-rich age, the volume of data that is generated is extremely large. Video highlight summarization has become increasingly valuable as video content continues to grow exponentially. Such summarization can save time, improve comprehension, and have other benefits.

BRIEF SUMMARY

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

One or more computer programs can be configured to perform particular operations or actions by virtue of including instructions that, when executed by data processing apparatus, cause the apparatus to perform the actions. One general aspect includes a method. The method also includes accessing, by a computing system, a video source may include one or more video clips, each clip of the one or more video clips may include a series of images, audio, and text elements associated with the series of images. The method also includes generating, by the computing system, a first set of embeddings based at least in part on the video source, the first set of embeddings may include an aligned image portion, an audio portion, and a text portion. The method also includes receiving, by the computing system, a query providing guidance for extracting clips from the video source, the guidance may include a first-part guidance and a second-part guidance, the first-part guidance may include preferences for events, and the second-part guidance may include criteria. The method also includes generating, by the computing system, a second set of embeddings based at least in part on the query. The method also includes performing, by a machine learning (ml) model of the computing system, a video analysis to select a subset of the one or more video clips using the first set of embeddings and the second set of embeddings, the subset of the one or more video clips being selected based at least in part on the first-part guidance and the second-part guidance.

Implementations may include one or more of the following features. The method where the first set of embeddings are generated by: encoding the series of images, text elements associated with the images into video embeddings; encoding the audio of the video source into audio embeddings; and aligning the video embeddings and the audio embedding. The text elements associated with the images are captions. The preferences may include events of interest in the video source to a user, and the events may include temporal events and spatiotemporal events. Generating the second set of embeddings may include combining encoded embeddings of the query and encoded embeddings of the text elements associated with the images. The ml model is an autoregressive decoder transformer. Performing the video analysis to select the subset of the one or more video clips may include: performing a similarity search using the second set of embeddings against the first set of embeddings; generating similarity scores for the one or more video clips based at least in part on the first-part guidance; and selecting the subset of the one or more video clips based at least in part on the generated similarity scores and the second-part guidance. The similarity search is cosine similarity search. Selecting the subset of the one or more video clips is performed by maximizing summation of the similarity scores of the selected subset. The method may include distributing the series of images in a video clip to have gradual increase and decrease of individual similarity score of each image. The criteria may include a duration of time and likelihood of repeat events. Total time of the subset of the one or more video clips is within the duration of time.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

In various embodiments, a computer-program product, comprising computer programs/instructions which, when executed by a processor, causes the processor to perform any of the methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1 is an example of an environment 100 that includes capabilities for providing services to users to generate video highlights, according to certain embodiments.

FIG. 3 is an example flowchart illustrating processing performed by the VHSS to generate personalized video highlight summaries from a video source based on a user's query, according to certain embodiments.

FIG. 4 is an example flowchart illustrating processing performed by the video analysis subsystem within the VHSS, according to certain embodiments

FIG. 6 is an example flowchart illustrating a generalized method for training a machine learning model, highlight clip estimator, within the VHSS, according to certain embodiments.

DETAILED DESCRIPTION

I. Introduction

Figure 2:
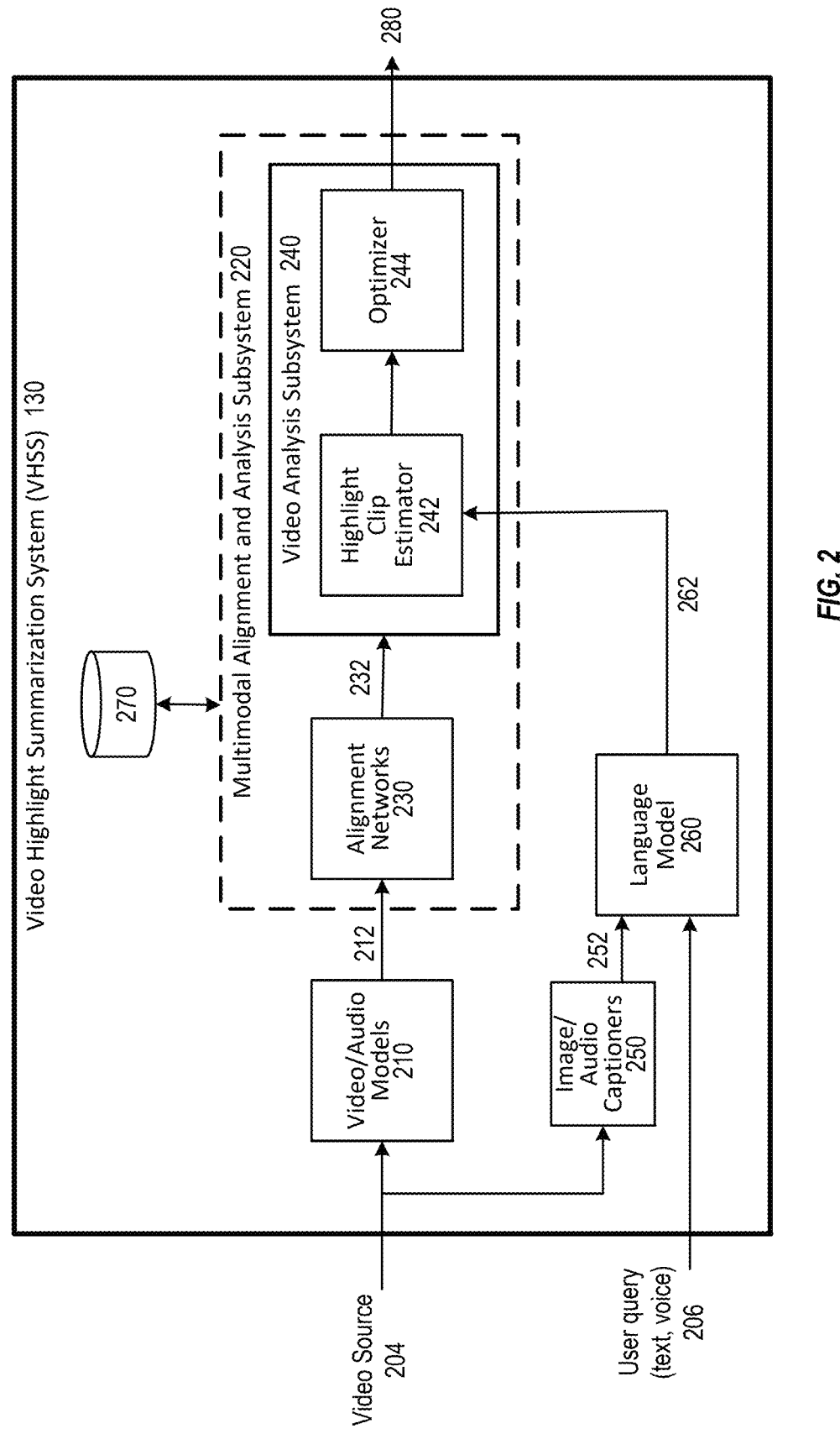
FIG. 2 is a simplified diagram of a distributed environment 200 illustrating an example of a video highlight summarization system (VHSS), according to certain embodiments.

Creating video highlights from a video source, such as sports matches or performances, that are personalized for different users is challenging. Simply capturing certain moments without a reason for capturing these events may not create compelling video highlights. Additionally, capturing these events may be subjective due to tool developers, reporters, or user inexperience. Finally, generating a lengthy video highlight summary to capture potential interesting events may serve the summarization purpose poorly.

FIG. 1 is an example of a distributed environment 100 that includes capabilities for providing services to users to generate personalized video highlights, according to certain embodiments. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1, the environment 100 includes a video source 110, a user input/query 120, a video highlight summarization system (VHSS) 130, and video highlights output 140. The video source 110 may include, but is not limited to, a full-length recording of games or matches (e.g., various sports like soccer, basketball, baseball, etc.), movies, streaming content (e.g., TV or YouTube), and user-generated videos. The user input or queries 120 may include specific criteria (e.g., summary duration or total time of the summary) and preferences (e.g., events of interest to the user) for the highlights the user likes to see, and may be in the form of text (e.g., keywords, topics, etc.) or natural language queries. The video highlight summarization system (VHSS) is a novel system for generating personalized video highlight summaries from video source 110 based on a user's input or queries 120. The video highlight output 140 may be selected as the top-ranked video highlights from video source 110 based on the user's input or query 120.

II. Video Highlight Summarization System (VHSS)

For the purpose of the present disclosure, a video may include both visual and audio components. The visual component may include moving images or frames. The audio component may be sound, such as dialogue, music, etc. A full-length video may be divided into multiple video clips, each with multiple frames and limited in length (e.g., 10 seconds). A frame is a complete image representing a single moment in time within the video. Thus, a video clip is a series of frames (or images) displayed sequentially. A video highlight clip may be a video clip of interest to a user.

For the purpose of the present disclosure, tokens may be words, subwords, or even individual characters, depending on the tokenization method used. Vectors may be mathematical representations of data as arrays of numbers. In the context of natural language processing (NLP), vectors can represent tokens, words, sentences, or entire documents. Embeddings may be a specific type of vector representation that captures semantic meaning. Embeddings can place semantically similar items (e.g., words or tokens) closer together in a high-dimensional space.

The disclosed techniques enable a VHSS to generate a personalized video highlight summary from a video source based on a user's query. The video highlight summarization may refer to a process of creating/generating a summary (e.g., a concise and/or condensed video) from the content of a lengthier video (e.g., the video source divided into multiple video clips) by selecting the most interesting parts for a user based on guidance from the user's query. The video may be a sports video or performance video, for example, a soccer game or match (also referred to as football in some countries). The disclosed techniques utilize a combination of advanced machine learning techniques and multimodal data analysis (including video analysis, alignment, etc.) to generate personalized video highlight summaries. The multimodal data may include information from video, audio, and texts from images associated with the video and from the user's query. The multimodal data may be encoded into multimodal embeddings (e.g., vector representations in a shared semantic space), then integrated and aligned to each other.

The disclosed techniques may also enable a user to provide a query (in text or text converted from natural language utterance) related to a sports match and specify the user's preferences (e.g., events of interest) and criteria (e.g., summary duration, also referred to as budget, for example, default may be set to 5 minutes) to personalize the summary. Some human preferences may be temporal events (e.g., a pass, a goal, a substitution, card, penalty shootout, etc.) or spatiotemporal events that may be a combination of spatial (location-based) and temporal (time-based) aspects, such as strategy formation, ball trajectories, tackles, etc. Additionally, diverse highlight clips, such as non-duplicate highlight clips or a lower likelihood of repeated events, are preferred. Such preference for diverse clips may be a default in the VHSS without user queries.

In some embodiments, the VHSS is capable of performing analysis of a sports match, such as a soccer match. The analysis may go beyond merely capturing particular actions or sudden moments by considering human logic to determine what is important, for example, players engaging in duals, special strategy formation, etc., that humans are interested in (i.e., human preferences). Such analysis may include semantic aspects (e.g., the relation between events with high momentum), strategic aspects (e.g., formation of players), etc., to identify the meaning, context, and relationship of various events in the sports match. For example, a particular strategy formation of the player may be followed by a goal later. Thus, the movements of some players may be important to the selection of video highlights.

In some embodiments, the VHSS may generate two sets of embeddings. One set of embeddings may align visual, audio, and frame text portions from the video source. Another set of embeddings may align the user's query and captions extracted from the video source. Such embeddings can help better align the frame text from the video source and query text from the user.

In some embodiments, video analysis may be performed by a video analysis subsystem that includes one or more machine learning (ML) models. The video analysis subsystem may perform a similarity search between the two sets of embedding based on the user's query to generate a similarity score for each video clip, and then select a subset (e.g., highlights) of the video clips from the video source that can maximize the summation of scores of highlight clips to fit the user's preferences best while meeting the user's criteria (e.g., summary duration) with diverse clips.

In some embodiments, some techniques, such as Weibull distribution and Multiple Constraint Knapsack optimization, may be utilized to help distribute the scored frames within a video clip more naturally similar to human interest and attention, and optimize the selection of highlight clips by considering various constraints corresponding to the user's criteria.

In some embodiments, the video analysis subsystem may recognize and remove or reduce redundant video clips (e.g., clips that are related to the same event, such as a replay of a goal from the video source). Furthermore, the VHSS may reduce subjectivity using metrics related to specific objectives for guidance.

Embodiments of the present disclosure provide a number of advantages/benefits. For example, the alignments of embeddings generated from the video source and the user query can improve the accuracy of identifying events in video clips of interest to the user. In addition, the VHSS considers various aspects (e.g., semantic aspects and strategic aspects) in the user's query to have a summary that fits the user's interest. Finally, the VHSS can generate a concise summary by selecting the most relevant video clips with minimum redundancy.

FIG. 2 is a block diagram of a distributed environment illustrating an example of a video highlight summarization system (VHSS), according to certain embodiments. The VHSS depicted in FIG. 2 may be implemented in many ways. In certain implementations, one or more computer systems may be used to implement the VHSS. In some implementations, the functionality provided by the VHSS may be offered as a cloud service by a cloud services provider (CSP). The cloud service may be made available to customers of the CSP that subscribe to the service. In such a cloud-based embodiment, the VHSS may be implemented using infrastructure (e.g., compute, memory, and networking infrastructure) provided by the CSP.

As shown in FIG. 2, the VHSS may include video/audio models 210, video/audio captioners 250, a language model 260, and a multimodal alignment and analysis subsystem 220, which includes alignment networks 230 and a video analysis subsystem 240.

The video/audio models 210 may receive data from the video source 204 (or 110). In some embodiments, the data from the video source 204 may be divided into video clips. The video/audio models 210 may include a pre-trained video encoder and audio encoder, and are used to generate video embeddings and audio embeddings. The pre-trained video encoder of the video/audio models 210 can encode both the visual content of videos and associated text descriptions (also referred to as text elements or frame text) into a shared embedding space, allowing for tasks like video-text matching and retrieval. Such video encoder may include, but not limited to, an extension of the Contrastive Language-Image Pretraining (x-CLIP) model, Video Joint-Embedding Predictive Architecture (VJEPA), and the like. In other words, the generated embeddings can capture both the visual and temporal aspects of video data, as well as associated text descriptions (i.e., frame texts).

The pre-trained audio encoder of the video/audio models 210 may encode audio waveforms into meaningful representations, which can be used as embeddings for downstream processing. Such audio encoder may include, but not limited to, Hidden-Unit Bidirectional Encoder Representations from Transformers (HuBERT), Contrastive Predictive Coding (CPC), and the like.

The alignment networks 230 may receive the embeddings 212 from the video/audio models 210. The alignment networks 230 can align embeddings of different modalities, such as video, audio, and frame text. In some embodiments, the alignment networks 230 include a video-language alignment network and an audio-language alignment network. The video-language alignment network portion of the alignment networks 230 may extract spatiotemporal features or text-conditioned visual information (e.g., captions, text descriptions, or text inputs used to guide or condition the processing of visual data) from videos. The audio-language alignment network portion of the alignment networks 230 may establish a temporal correspondence between spoken words in audio and their textual representation (e.g., transcript or linguistic annotations). In some embodiments, the video/audio-language alignment networks 230 may be Query Transformer (Q-former), large language model (LLaMA), and the like. In some embodiments, the outputs of the video-language alignment network and the audio-language alignment network may be concatenated. The concatenated result 232 may be the aligned video embeddings, audio embeddings, and their associated frame text embeddings. Such result 232 may also be referred to as video-audio language aligned embeddings/tokens, and temporarily stored in an embedding database 270.

The alignment of multimodal data (e.g., video, audio, and their associated frame texts) may help identify important events. For example, an important event (e.g., a goal) may usually be accompanied by a loud sound coming from the audience, and the caption associated with the video may indicate whether a ball has entered or not entered the goal line. Additionally, such alignment may also help capture player formation. For example, the movement of a particular player with shirt number 10 may be tracked based on video images, audio from a reporter, and possibly a caption indicating that player number 10 has moved to a different location. Thus, video-audio language alignment may effectively capture both temporal context (e.g., high-motion events, such as goals) and spatiotemporal events (e.g., formation, ball trajectories, etc.).

In FIG. 2, the VHSS may receive a user's query 206 (or input prompt), which may be in the form of text or natural language utterance (e.g., speech), handwriting, etc. The user's query 206 in various forms may be converted into texts for processing. The user's query 206 may include specific criteria (e.g., summary duration or total time of the summary in seconds or minutes) and/or preferences. An example of the user's query 206 may be, "I want to capture all events associated with player X." In some embodiments, the user may not input any query, and the VHSS may generate video highlights based on its objective guidelines and criteria, for example, events of interest to most viewers or based on expert suggestions. A language model 260 may take the user's query 206 and generate query text embeddings 262. In some embodiments, the language model 260 may be a text encoder, such as text-embedding-3-large (LLaMA-3).

Furthermore, image/audio captioners 250 may be used to help align the query text embeddings 262 and video-audio language aligned tokens 232. The image/audio captioners 250 may include an image captioner and an audio captioner. The image captioner may process or analyze visual data (e.g., images or video frames) that includes visual elements like objects, scenes, colors, and spatial relationships, and generate textual description (or caption) of the analyzed visual data. In some embodiments, the image captioner may be Bootstrapping Language-image Pre-training (BLIP-2). The audio captioner may process or analyze audio signals (e.g., waveform or spectrograms) that include acoustic features, sound events, and temporal patterns and generate textual descriptions of the analyzed audio signal. For example, an image captioner analyzing a video scene that includes children playing in a park with birds chirping in the background may generate a caption of "a group of children playing in a sunny park." A corresponding audio captioner may generate a caption of "children laughing accompanied by bird chirping."

The captions 252 generated by the image/audio captioners 250 may be provided to the language model 260, which combines the user's query 206 and captions 252 to generate query text embeddings 262. Because the image/audio captioners 250 take the same video source 204 that is also provided to the video/audio models 210, the generated query text embeddings 262 can ensure that the frame text associated with the video and audio from video source 204 and query text from user's query 206 are highly aligned. Taking examples discussed above, a user's query "please capture all events associated with player X" and the frame text indicating the existence of player X may both be aligned together by the language model 260 in the model's output query text embeddings 262. Such alignment may lead to higher inner product between query text embeddings 262 and the video-audio language embeddings 232, and higher cosine similarity as a result.

Continuing FIG. 2, the video analysis subsystem 240 may be responsible for analyzing the video clips that have been processed (resulting in video-audio language aligned tokens 232) by the video/audio models 210 and alignment networks 230 discussed above. In addition to the pre-processed video clips (e.g., video-audio language aligned tokens), video analysis subsystem 240 may also receive a query text embeddings 262 that have aligned the user's query text and frame text. In other words, the video analysis subsystem 240 may analyze the video clips from the video source 204 by considering the user's query 206.

In some embodiments, the video analysis subsystem 240 may include a highlight clip estimator 242 and an optimizer 244. In other embodiments, highlight clip estimator 242 and optimizer 244 may be combined as a single module. The highlight clip estimator 242 may be a machine learning model, such as an autoregressive decoder transformer. An autoregressive model may use its previous outputs as inputs for making future predictions—e.g., generate output sequence one token at a time, using previously generated tokens as input for predicting the next token to maintain coherence and context throughout the output.

The highlight clip estimator 242 may receive and process one frame at a time, and then calculate the cosine similarity between the query text embeddings (or vectors) and the embeddings (or vectors) of each video clip (e.g., 10-second frames), for example, by performing similarity search using the query text embeddings 262 against the embeddings (e.g., video-audio language aligned tokens 232) stored in the database 270 to generate a similarity score. In some embodiments, the similarity search techniques may include, but not limited to, cosine similarity search, Euclidean distance, dot product similarity, and the like. In other words, the highlight clip estimator 242 may predict how well (e.g., a score) each video clip meets the user's query (e.g., criteria and preferences). In some embodiments, the highlight clip estimator 242 may generate a score for each frame, and then an overall score for a clip containing frames in a 10-second duration. In some embodiments, the overall score of a clip may be an average of scores of frames, the highest score within the frames associated with the clip, etc.

In some embodiments, highlight clip estimator 242 may utilize a Weibull-based score function to capture the distribution of events in a sports match (e.g., a soccer game). The selection of frames for inclusion in a highlight clip may depend on how well the frames align with the user input prompt. The score function may also be used as a smoothing mechanism for distributing the frames. For example, a particular frame (e.g., containing a soccer goal) in a clip may be the height (or peak) of that clip. In a two-dimensional (2D) space, displaying scores of frames in the y-axis and time in the x-axis, the clip may be shown as a spike because of the single moment of the goal (e.g., one frame captures the goal moment). So, the score representing the user's preference jumps up suddenly, and then drops significantly. The highlight clip estimator 242 can help make the distribution of frame scores in a clip more natural, like human interest and attention (e.g., interest increases and decreases more gradually because the audience is getting engaged before the goal, and some excitement lingers afterward). Such distribution resulting from the smoothing mechanism may improve the likelihood that the adjacent frames to the peak frame are highlighted because the adjacent frames to the particular goal event may also be interesting or important. The Weibull-based score function may be illustrated below:

$$\text{score}(j) = \sum_{i,vote(i)=1}^{n} \text{weibull}_i(j) = \frac{k}{\lambda}\left(\frac{j/t - i/t + m}{\lambda}\right)^{k-1} e^{-\left(\frac{j/t}{\lambda}\right)^k} \quad \text{Equation \#1}$$

In equation #1 shown above, the Weibull distribution (with scale, $\lambda$=1, and shape, k=1.5) may be applied to each selected frame (vote (i)) at instant i. The distributions across all time instances ($j \in [n]$) may be summed together, where n is the length of the video. The Weibull distribution can help soften the voting function and improve the likelihood of adjacent frames close to the peak frame (or the frame with the highest score) being highlighted. The combined function may be referred to as a score function (e.g., t=10), where t may be a hyperparameter.

In some embodiments, for a number (e.g., k) of video clips, the highlight clip estimator 242 may take concatenated tokens of video-audio language aligned tokens 232 and query text tokens (or embeddings) 262 as input. The query text tokens 262 may act as query (B×N×D), while the video-audio language aligned tokens 232 may act as key and value (B×k×320×D).

In some embodiments, a dictionary mapping clip IDs to similarity scores may be created by the highlight clip estimator 242. A dictionary may refer to a data structure that stores key-value pairs. The key may be a clip ID, a unique identifier for a specific video or audio clip. The value associated with the key may be metadata or features related to the clip. The dictionary, along with the user's desired summary duration, may then be passed to the optimizer 244 (e.g., a Bayesian optimizer), which selects the clips with high similarity scores to be included in the video highlight summary.

In some embodiments, the user's query may include criteria (or constraints), such as preferred summary duration (called budget). The optimizer 244 may select an optimal subset of the scored clips to meet the budget requirement. The optimizer 244 may combine these selected clips using Multiple Constraint Knapsack optimization to create a video highlight summary. A Multiple Constraint Knapsack optimization may refer to a technique that can maximize the value of items packed into a knapsack under multiple resource constraints. In other words, the knapsack optimization may be utilized by VHSS to maximize the summation of scores of highlight clips to best fit the user's preferences, while meeting the budget or summary duration in the user's criteria and reducing redundant clips (i.e., increase clip diversity). In some instances, some clips with high scores generated by the highlight clip estimator 242 may be close to each other in a time domain. These clips that are close to each other may correspond to the same event (e.g., goal) and become redundant. For example, one video clip may show a goal, while the other video clip may be a replay of that goal. In some embodiments, after the highlight clip estimator 242 generates a score for each clip, it may assign higher probabilities to clips with higher score for the optimizer 244 to process.

The following Equation #2 illustrates a reward scheme based on the Multiple Constraint knapsack approach to select the optimal number of highlight clips.

$$\text{reward}(v) = \text{maximize} \sum_{i \in [k]} u_i p_i \qquad \text{Equation \#2}$$

$$\text{where, } u_i \in \{0, 1\}, b \leqslant u_1 + u_2 + \cdots + u_k \leqslant B$$

$$\text{and, minimize} \sum_{i,j} u_i u_j e^{-\rho|i-j|}$$

The reward scheme may have three parts. The top part (maximize $\sum u_i p_i$) of Equation #2 may denote the summation of the scores of highlight clips. The middle part (b≤ . . . ≤B) of Equation #2 may denote the budget constraint (e.g., summary duration of clips). The lower part (minimize $\sum u_i u_j$ . . . ) of Equation #2 may correspond to lower likelihood of repeated events or eliminating redundant clips. In Equation #2, $u_i$ may denote a video clip. $P_i$ may denote the probability assigned by the highlight clip estimator 242, which may be proportional to the score of a clip. The factor, $e^{-\Sigma|i-j|}$, in the lower part of Equation #2 may be introduced to increase the diverse coverage of the video (e.g., reducing clip redundancy such that more dissimilar clips can be selected), where p may be a hyperparameter that controls the impact of distance between frames.

FIG. 3 is an example flowchart illustrating processing performed by the VHSS to generate personalized video highlight summaries from a video source based on a user's query, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 3 may include a greater number or a lesser number of steps than those depicted in FIG. 3.

[0055] At step 310, a video source may be accessed by a VHSS. The video source may include one or more video clips, where each clip includes a series of images, audio, and text elements associated with the images. For example, in FIG. 2, VHSS 130 may access video source 204. The visual content of the video source may have associated text descriptions (also referred to as text elements or frame text). The data from video source 204 may be divided into video clips.

At step 320, a first set of embeddings may be generated, by video/audio models, based on the video source. The first set of embeddings may include visual embeddings and audio embeddings. For example, in FIG. 2, the video encoder of the video/audio models 210 can encode both the visual content of the video source 204 (e.g., the series of images) and associated text descriptions into a shared embedding space (an example of visual embeddings). The audio encoder of the video/audio models 210 may encode audio content of the video source 204 and associated text descriptions into audio embeddings.

At step 322, the first set of embeddings may be aligned by alignment networks. The first set of the aligned embeddings may include a visual (or image) portion, audio portion and frame text portion. For example, in FIG. 2, the alignment networks 230 may align the visual/video embeddings (including the image portion and associated text portion called frame text), and audio embeddings.

At step 330, captions may be extracted, by image/audio captioners, from the video source. For example, in FIG. 2, an image captioner of the image/audio captioners 250 may analyze visual data of video source 204 to generate textual descriptions (or captions). An audio captioner of the image/audio captioners 250 may analyze audio data of the video source 204 to generate textual descriptions (or captions) of the analyzed audio data. In some embodiments, the textual descriptions or captions extracted by the image/audio captioners 250 may be the same or similar to the text elements associated with the images in 310.

At step 332, a user's query may be received, by a language model within the VHSS. The user's query providing guidance may include a first-part guidance and a second-part guidance for extracting clips from the video source. For example, in FIG. 2, a user's query 206 may be received by the language model 260. The query 206 may have two parts. The first part (an example of the first-part guidance) may include preferences for events or events of interest to the user, such as a goal, strategy formation, and a player's activities. The second part (an example of the second-part guidance) may include criteria, such as summary duration (i.e., duration of time) and diversity of clips (e.g., fewer redundancies or lower likelihood of repeated events).

At step 334, a second set of embeddings may be generated, by the language model within the VHSS, based on the user's query. For example, in FIG. 2, in some embodiments, the language model 260 may generate query text embeddings 262 (an example of the second set of embeddings) by first combing and aligning the extracted captions (e.g., captions 252 of FIG. 2) in 330 and the user's query (e.g., 206) in 332, and then encoding the combined information. In other embodiments, the query text embeddings 262 may be generated by combining the encoded embeddings of the extracted captions (e.g., captions 252 of FIG. 2) in 330 and the encoded embeddings of the user's query (e.g., 206) in 332. The generated query text embeddings 262 can ensure that the frame text associated with the video and audio from video source 204 and query text from the user's query 206 are highly aligned.

At step 340, a video analysis may be performed, by a video analysis subsystem within the VHSS, using the first set of embeddings and the second set of embeddings. For example, in FIG. 2, a video analysis subsystem 240 may perform a video analysis (part of multimodal data analysis) using the first set of embeddings generated in 320 and the second set of embeddings generated in 334. Further details describing the video analysis are described below in FIG. 4.

At step 350, a video highlight summary may be generated, by the video analysis subsystem. For example, in FIG. 2, a video highlight summary 280, which is a summary (e.g., a concise and/or condensed video) of the content of a lengthier video (e.g., the video source 204) by selecting the most interesting parts for a user based on guidance from a user's query.

FIG. 4 is an example flowchart illustrating processing performed by the video analysis subsystem within the VHSS, according to certain embodiments. FIG. 4 provides further sub-steps for one or more steps (e.g., steps 340 and 350) in the FIG. 3. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 4 may include a greater number or a lesser number of steps than those depicted in FIG. 4.

At step 410, a similarity search may be performed, by the highlight clip estimator (an example of a machine learning model), using the query text embeddings against the first set of embeddings. For example, in FIG. 2, the highlight clip estimator 242 may calculate the cosine similarity between the query text embeddings 262 and the embeddings of each video clip (e.g., 10-second frames), for example, by performing similarity search using the query text embeddings 262 against the embeddings (e.g., video-audio language aligned tokens 232) stored in the database 270.

At step 420, similarity scores may be generated, by the highlight clip estimator, for one or more video clips based on the user's preferences (an example of a first-part criteria). For example, the user's query may contain a preference for player X performing a particular activity (e.g., a goal or penalty kick). A similarity score may be generated for each of the one or more video clips to predict how well these clips match the user's preference (i.e., performing the particular activity by player X). In some embodiments, the highlight clip estimator 242 may generate a score for each frame, and then an overall score for a clip containing frames in a 10-second duration. One or two frames in that clip may fit the user's preference best and have the highest frame scores among all frames in the clip. In some embodiments, Weibull-based methodology may be used to distribute the frames within their associated clip more naturally.

At step 430, a subset of the one or more video clips may be selected, by an optimizer, based on the generated similarity scores and summary duration and/or clip diversity (an example of a second-part guidance). For example, in FIG. 2, the optimizer 244 may select a subset of the video clips using a Multiple Constraint Knapsack optimization technique to optimize the selected result under one or more of three constraints: (1) maximize the summation of similarity scores of highlight clips to best fit the user's preferences; (2) meeting the budget or summary duration in the user's criteria; and (3) reducing redundant clips. The selected video clips may be combined to output as the video highlight summary 280. For example, the optimizing technique may look at different subsets of ten video clips (e.g., clips 1-10), and find that the third subset (e.g., clips 1, 2, 8) has the highest summation value while meeting the summary duration with low repeated events. Thus, video clips 1, 2, and 8 may be combined to become the video highlight summary 280.

Figure 5:
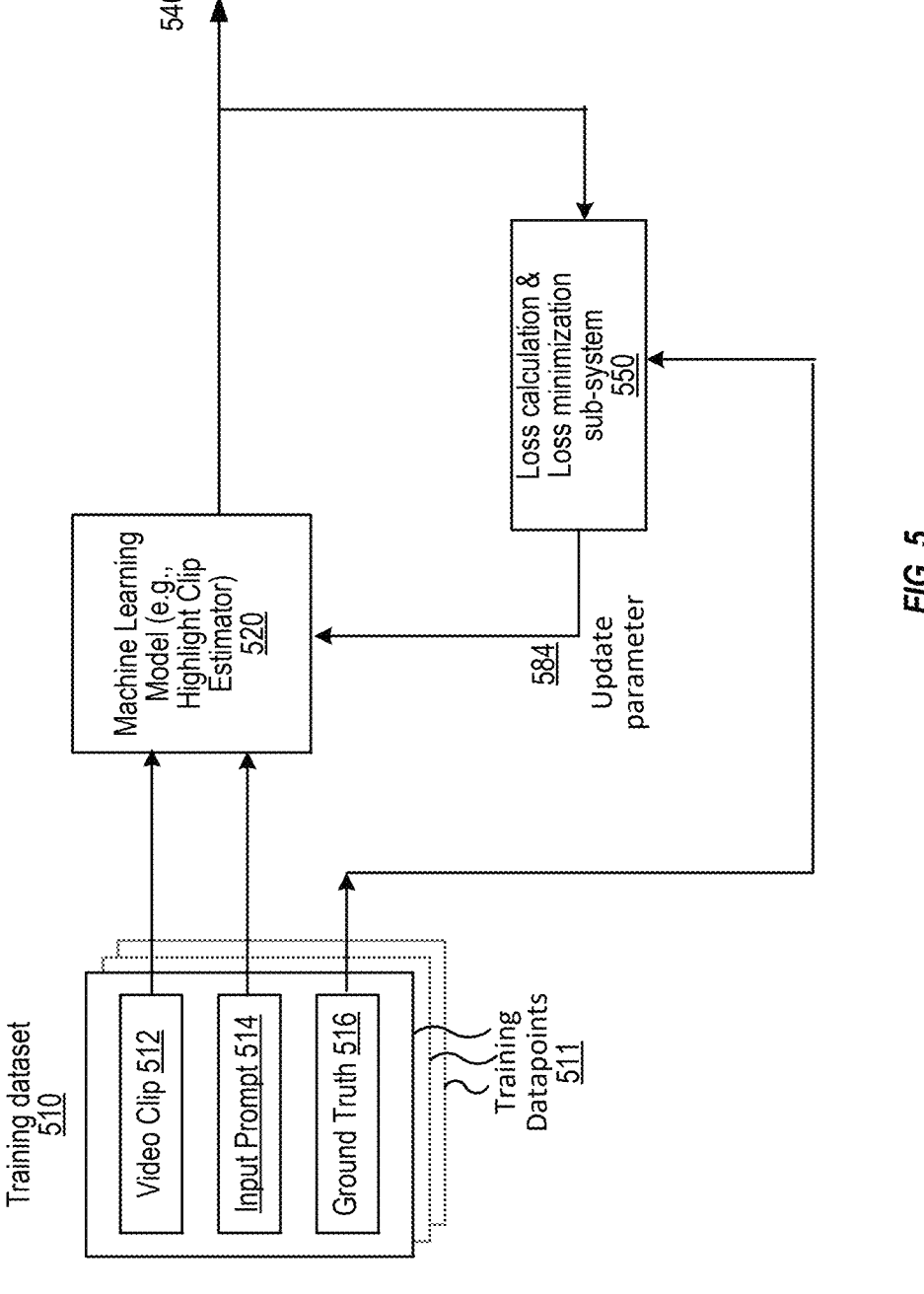
FIG. 5 is a simplified block diagram of a training environment 400 used to train a machine learning model, highlight clip estimator, within the VHSS, according to certain embodiments.

FIG. 5 is a simplified block diagram of a training environment 500 used to train a machine learning model, highlight clip estimator, within the VHSS, according to certain embodiments. The training environment 500 depicted in FIG. 5 is merely an example and is not intended to unduly limit the scope of claimed embodiments. Many variations, alternatives, and modifications are possible. For example, in some implementations, training environment 500 may have more or fewer systems or components than those shown in FIG. 5, may combine two or more systems, or may have a different configuration or arrangement of systems. The systems, subsystems, and other components depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

In FIG. 5, in some embodiments, the machine learning (ML) model, highlight clip estimator 520, may be trained using supervised learning using the training dataset 510. The training dataset 510 may include multiple training datapoints 511. Each training datapoint may include a training video clip 512, an input prompt 514, and a ground truth information 516, which may include a target score for the training video clip using Weibull-based methodology. The input prompt 514 may include various user queries (e.g., criteria and preferences), as discussed above. For example, each sport (e.g., soccer) match may be segmented into 10-second clips (i.e., training video clips). These segments are annotated with a tuple of (start-time, central time, and end-time), pinpointing the exact moment an event (goal, save, miss, foul, card given, etc.) occurs. The ground truth information may have time segments (i.e., start/central/end time) and specific time moments associated with a plurality of events. In some embodiments, the training dataset may be video data that includes a spatial-temporal action-activity dataset or a dataset specific to a particular sport (e.g., soccer).

The training video clip 512 and input prompt 514 may be provided as inputs to the highlight clip estimator 520 to generate a score for the training video clip 512 based on the input prompt 514. In some embodiments, a score for each frame of a set of frames corresponding to the training video clip 512 may be generated. The Weibull-based methodology may be used to adjust the distribution of frames and associated scores within the clip to generate an overall score of the clip.

The ground truth 516 may be provided as an input to a loss calculation & loss minimization sub-system 550 performing supervised fine-tuning. The loss calculation computes the discrepancy between the model's prediction (e.g., the generated score 540) and the ground truth 516 (e.g., target score). The loss minimization aims to adjust the model's trainable parameters (e.g., weights and biases) via 584 to minimize the computed loss. In some embodiments, the loss calculation and the loss minimization may be two separate modules (e.g., loss function/calculation and loss minimization) in the sub-system 550. In some embodiments, the supervised learning may or may not utilize backward propagation techniques.

In some embodiments, the loss minimization may be a technique utilizing a modified N-pair loss of contrastive learning. The modified N-pair loss of contrastive learning can enable the video clip containing the central-time scores highest, with scores gradually decreasing to either the start or end time, while maintaining partial similarity for clips at these boundaries. Contrastive learning may be a technique that can train ML models to recognize similarities and differences between data samples by comparing them directly. N-pair loss of contrastive learning can recognize similarities and differences between items by comparing one positive pair against multiple negative examples at the same time, and achieve better performance than other loss functions in certain areas, such as visual recognition.

In some embodiments, the training environment 500 may include both highlight clip estimator 520 and optimizer 244. Under this approach, the ground truth information 516 may include a target video highlight summary. In other embodiments, the highlight clip estimator 520 and optimizer 244 may be separately trained.

In further embodiments, the training environment 500 may also include training alignment networks 230, which may be trained separately from the ML model (e.g., highlight clip estimator 520). The training dataset for the alignment networks 230 may be general data not specific to sports or performance, and the ground truth information may include target aligned embeddings based on the general data.

FIG. 6 is an example flowchart illustrating a generalized method for training a machine learning model, highlight clip estimator, within the VHSS, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 6 may include a greater number or a lesser number of steps than those depicted in FIG. 6.

At step 610, a training dataset comprising multiple training datapoints to a machine learning (ML) model (e.g., highlight clip estimator 520) may be obtained. For example, in FIG. 6, a training dataset 510 has multiple training datapoints, where each training datapoint 511 may include a training video clip 512, an input prompt 514, and a ground truth information 516.

At step 620, which include steps 630, 640, and 650. These steps are performed for each training datapoint. At step 630, a score for the training video clip 512 associated with the training datapoint 511 may be generated based on the input prompt 514 associated with the training datapoint 511. In some embodiments, a similarity score for each frame/image of a set of frames corresponding to the training video clip 512 may be generated. The Weibull-based methodology may be used to adjust the distribution of frames and associated scores within the clip to generate an overall score of the clip.

At step 640, a loss may be computed using a loss function based on the score generated in 630 and the ground truth information 516 for the datapoint. For example, in FIG. 5, a loss function, as part of the loss calculation and the loss minimization sub-system 550, may compute a loss based on the discrepancy between the model's prediction (e.g., the similarity score 540) and the ground truth information 516 for a datapoint 511.

At step 650, a loss minimization may be performed for the loss value in 640 and update model parameters of the ML model being trained. For example, in FIG. 5, by using backward propagation techniques, the loss calculation and the loss minimization sub-system 550 may further perform loss minimization by updating the ML model's parameters (e.g., weights and biases) 584 to minimize the computed loss.

III. Example Cloud Service Provider Infrastructure (CSPI) Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
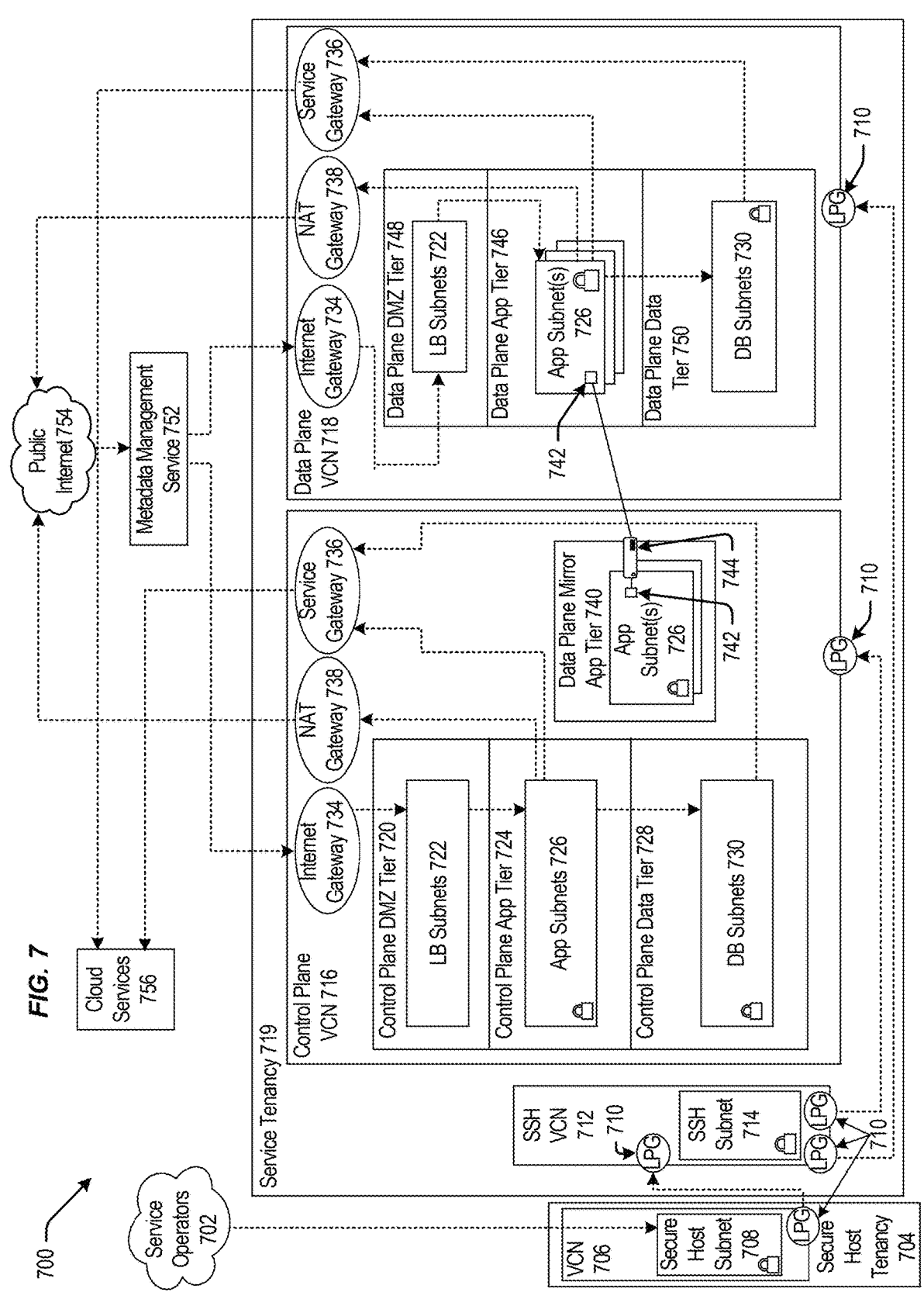
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
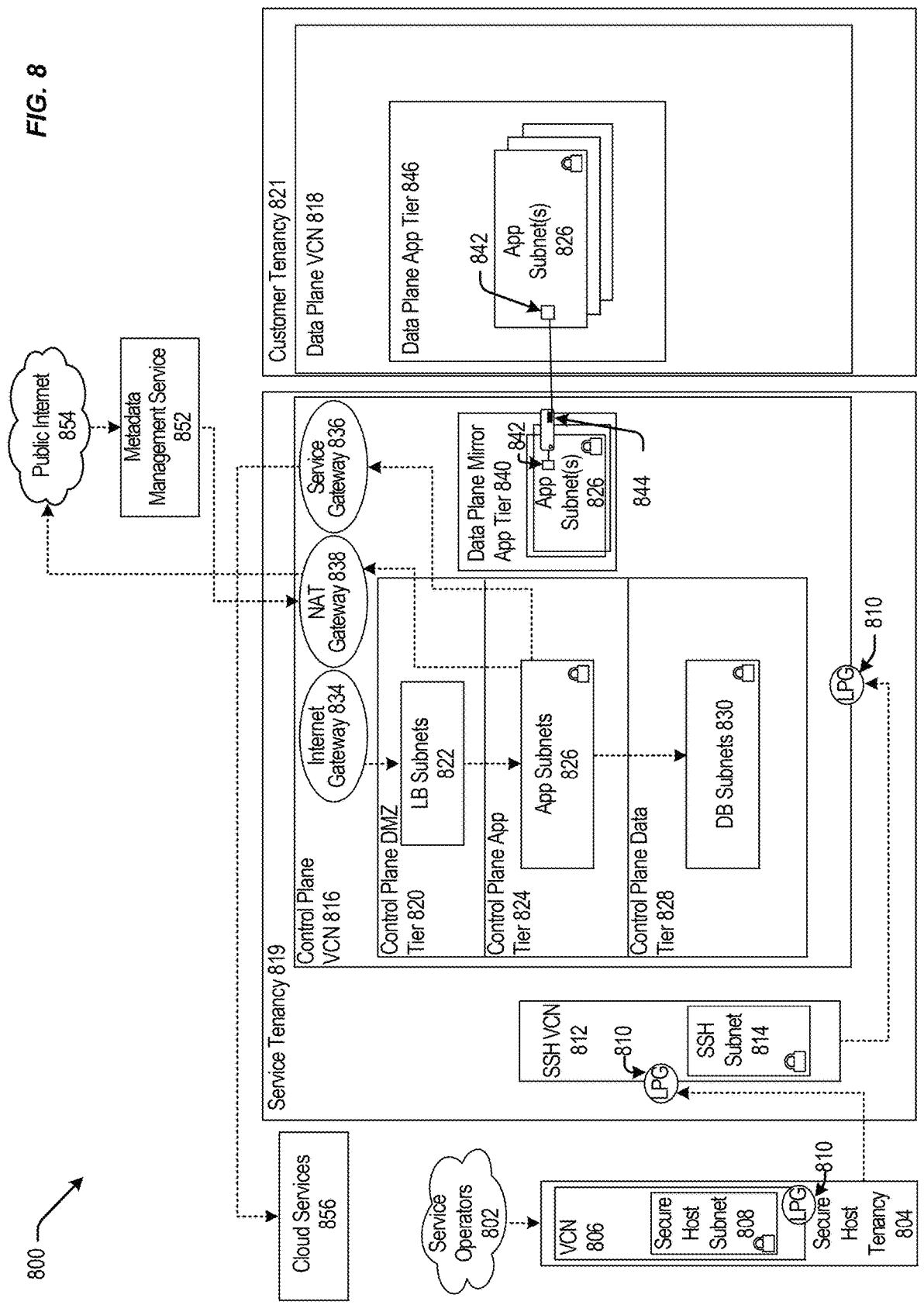
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
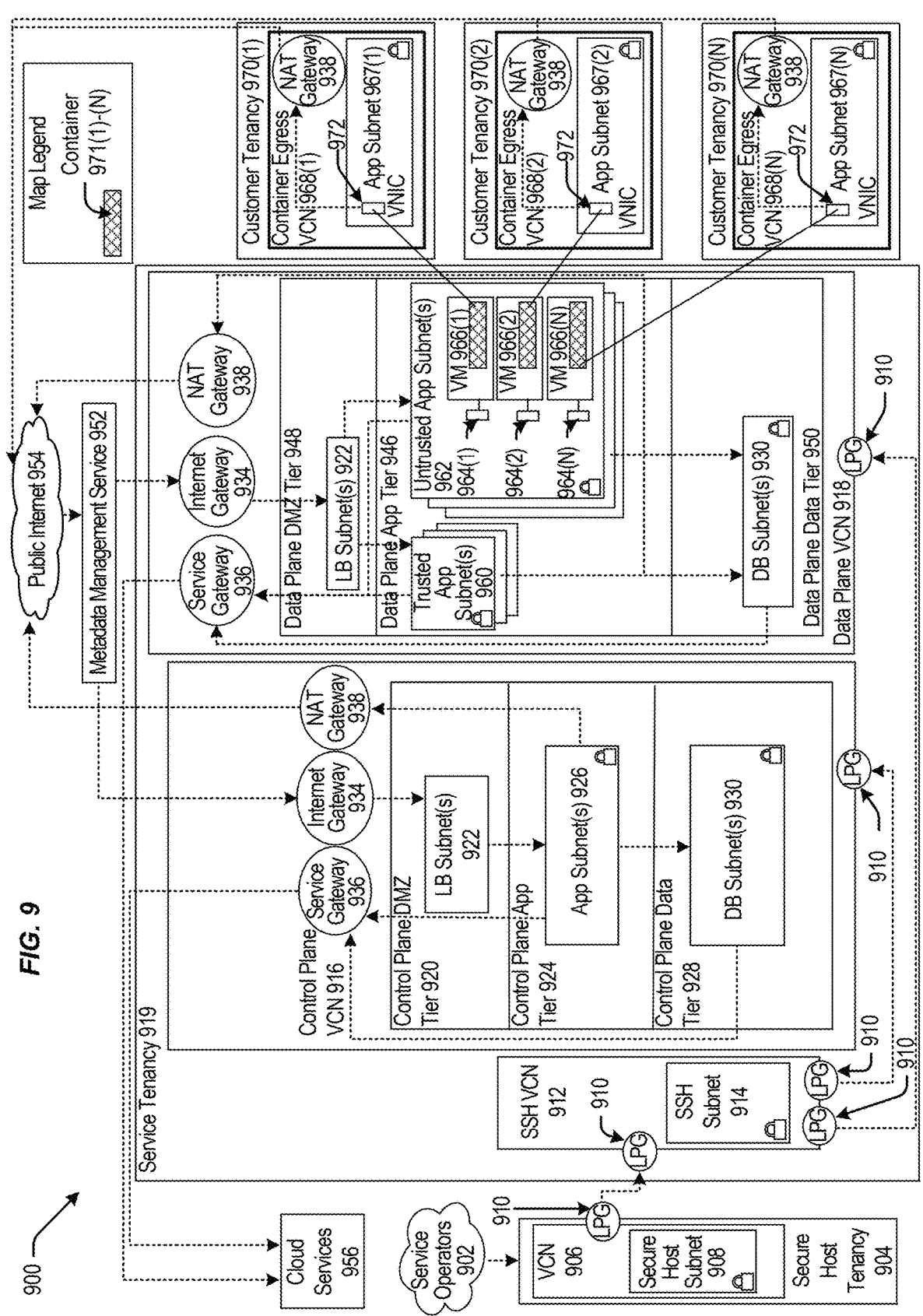
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
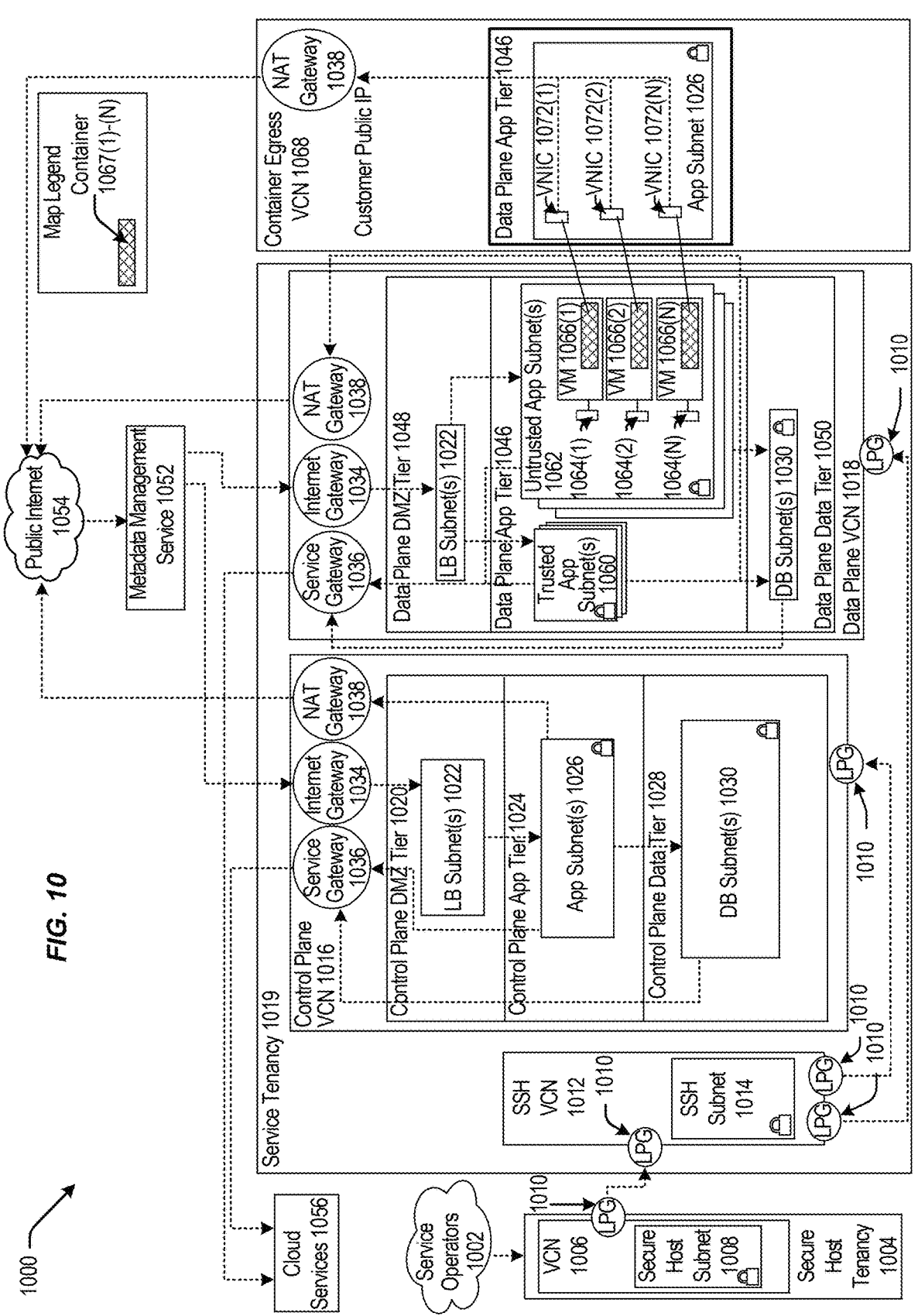
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
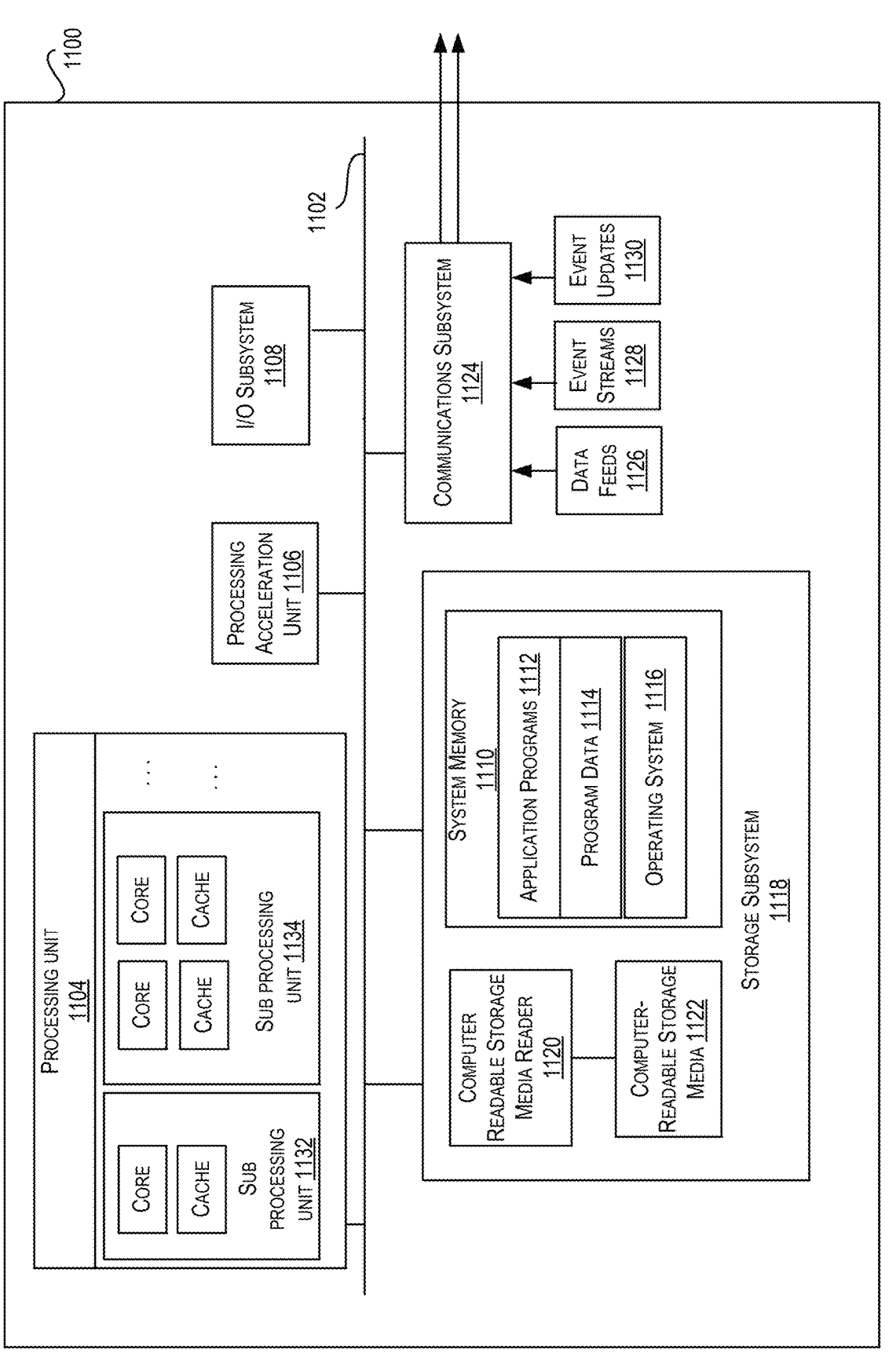
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

accessing, by a computing system, a video source comprising one or more video clips, each clip of the one or more video clips comprising a series of images, audio, and text elements associated with the series of images;

generating, by the computing system, a first set of embeddings based at least in part on the video source, the first set of embeddings comprising an aligned image portion, an audio portion, and a text portion;

receiving, by the computing system, a query providing guidance for extracting clips from the video source, the guidance comprising a first-part guidance and a second-part guidance, the first-part guidance comprising preferences for events, the second-part guidance comprising criteria, and the criteria comprising a duration budget;

generating, by the computing system, a second set of embeddings based at least in part on the query; and performing, by a machine learning (ML) model of the computing system, a video analysis comprising:

dividing the first set of embeddings into a plurality of sections;

determining a similarity score between each section of the plurality of sections and the second set of embeddings; and generating a summary of the one or more video clips using the first set of embeddings and the second set of embeddings, the summary including a subset of the one or more video clips being selected based at least in part on the first-part guidance and the second-part guidance.

2. The method of claim 1, wherein the first set of embeddings are generated by:

encoding the series of images, text elements associated with the images into video embeddings;

encoding the audio of the video source into audio embeddings; and aligning the video embeddings and the audio embedding.

3. The method of claim 2, wherein the text elements associated with the images are captions.

4. The method of claim 1, wherein the preferences comprise events of interest in the video source to a user, and the events comprise temporal events and spatiotemporal events.

5. The method of claim 1, wherein generating the second set of embeddings comprises combining encoded embeddings of the query and encoded embeddings of the text elements associated with the images.

6. The method of claim 1, wherein the ML model is an autoregressive decoder transformer.

7. The method of claim 1, wherein performing the video analysis to select the subset of the one or more video clips comprises:

performing a similarity search using the second set of embeddings against the first set of embeddings;

generating similarity scores for the one or more video clips based at least in part on the first-part guidance; and selecting the subset of the one or more video clips based at least in part on the generated similarity scores and the second-part guidance.

8. The method of claim 7, wherein the similarity search is cosine similarity search.

9. The method of claim 7, wherein selecting the subset of the one or more video clips is performed by maximizing summation of the similarity scores of the selected subset.

10. The method of claim 7, further comprising distributing the series of images in a video clip to have gradual increase and decrease of individual similarity score of each image.

11. A non-transitory computer-readable medium storing computer-executable instructions that, when executed by one or more processors of a computing system, cause the one or more processors to perform operations comprising:

accessing, by the computing system, a video source comprising one or more video clips, each clip of the one or more video clips comprising a series of images, audio, and text elements associated with the series of images;

generating, by the computing system, a first set of embeddings based at least in part on the video source, the first set of embeddings comprising an aligned image portion, an audio portion and a text portion;

receiving, by the computing system, a query providing guidance for extracting clips from the video source, the guidance comprising a first-part guidance and a second-part guidance, the first-part guidance comprising preferences for events, and the second-part guidance comprising criteria, and the criteria comprising a duration budget;

generating, by the computing system, a second set of embeddings based at least in part on the query; and performing, by a machine learning (ML) model of the computing system, a video analysis comprising:

dividing the first set of embeddings into a plurality of sections;

determining a similarity score between each section of the plurality of sections and the second set of embeddings; and generating a summary of the one or more video clips using the first set of embeddings and the second set of embeddings, the summary including a subset of the one or more video clips being selected based at least in part on the first-part guidance and the second-part guidance.

12. The non-transitory computer-readable medium of claim 11, wherein the first set of embeddings are generated by:

encoding the series of images, text elements associated with the images into video embeddings, wherein the text elements associated with the images are captions;

encoding the audio of the video source into audio embeddings; and aligning the video embeddings and the audio embedding.

13. The non-transitory computer-readable medium of claim 11, wherein generating the second set of embeddings comprises combining encoded embeddings of the query and encoded embeddings of the text elements associated with the images.

14. The non-transitory computer-readable medium of claim 11, wherein performing the video analysis to select the subset of the one or more video clips comprises:

performing a similarity search using the second set of embeddings against the first set of embeddings;

generating similarity scores for the one or more video clips based at least in part on the first-part guidance; and selecting the subset of the one or more video clips by maximizing summation of the similarity scores of the selected subset and the second-part guidance, wherein the second-part guidance comprises a duration of time and likelihood of repeat events.

15. A computing system, comprising:

one or more processors; and one or more non-transitory computer readable media storing computer-executable instructions that, when executed by the one or more processors of the computing system, cause the computing system to:

access, by the computing system, a video source comprising one or more video clips, each clip of the one or more video clips comprising a series of images, audio, and text elements associated with the series of images;

generate, by the computing system, a first set of embeddings based at least in part on the video source, the first set of embeddings comprising an aligned image portion, an audio portion and a text portion;

receive, by the computing system, a query providing guidance for extracting clips from the video source, the guidance comprising a first-part guidance and a second-part guidance, the first-part guidance comprising preferences for events, and the second-part guidance comprising criteria, and the criteria comprising a duration budget;

generate, by the computing system, a second set of embeddings based at least in part on the query; and perform, by a machine learning (ML) model of the computing system, a video analysis comprising:

dividing the first set of embeddings into a plurality of sections;

determining a similarity score between each section of the plurality of sections and the second set of embeddings; and generating a summary of the one or more video clips using the first set of embeddings and the second set of embeddings, the summary including a subset of the one or more video clips being selected based at least in part on the first-part guidance and the second-part guidance.

16. The computing system of claim 15, wherein the first set of embeddings are generated by:

encoding the series of images, text elements associated with the images into video embeddings, wherein the text elements associated with the images are captions;

encoding the audio of the video source into audio embeddings; and aligning the video embeddings and the audio embedding.

17. The computing system of claim 15, wherein generating the second set of embeddings comprises combining encoded embeddings of the query and encoded embeddings of the text elements associated with the images.

18. The computing system of claim 15, wherein performing the video analysis to select the subset of the one or more video clips comprises:

performing a similarity search using the second set of embeddings against the first set of embeddings;

generating similarity scores for the one or more video clips based at least in part on the first-part guidance; and selecting the subset of the one or more video clips by maximizing summation of the similarity scores of the selected subset and the second-part guidance, wherein the second-part guidance comprises a duration of time and likelihood of repeat events.

19. The method of claim 1 wherein the summary of the one or more video clips is selected based at least in part on the first-part guidance and the second-part guidance configured at least in part so that the summary maximizes a sum over the similarity scores associated with each section in the summary;

the summary ensures a total duration of the summary is less than the duration budget; or the summary removes redundant sections of the plurality of sections.

* * * * *